US012640515B2

(12) United States Patent
Hara

(10) Patent No.: US 12,640,515 B2
(45) Date of Patent: May 26, 2026

(54) ELECTRONIC CONTROL DEVICE

(71) Applicant: HITACHI ASTEMO, LTD., Hitachinaka (JP)

(72) Inventor: Hideyuki Hara, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 285 days.

(21) Appl. No.: 18/547,808

(22) PCT Filed: Dec. 1, 2021

(86) PCT No.: PCT/JP2021/044083

§ 371 (c)(1),
(2) Date: Aug. 24, 2023

(87) PCT Pub. No.: WO2022/209006

PCT Pub. Date: Oct. 6, 2022

(65) Prior Publication Data

US 2024/0145985 A1 May 2, 2024

(30) Foreign Application Priority Data

Mar. 30, 2021 (JP) ................................ 2021-056604

(51) Int. Cl.
*H01R 13/52* (2006.01)
*H01R 13/66* (2006.01)

(52) U.S. Cl.
CPC ....... *H01R 13/521* (2013.01); *H01R 13/6683* (2013.01)

(58) Field of Classification Search
CPC .......................... H01R 13/521; H01R 13/6683
(Continued)

(56) References Cited

U.S. PATENT DOCUMENTS 3,487,353 A * 12/1969 Massa .................. H01R 13/523 439/852
4,083,902 A * 4/1978 Clyde ................ H01R 13/5216 264/46.7

(Continued)

FOREIGN PATENT DOCUMENTS

JP H09-159537 A 6/1997
JP 2018-014271 A 1/2018
JP 2020-148639 A 9/2020

OTHER PUBLICATIONS

International Preliminary Report on Patentability and Written Opinion dated Oct. 12, 2023 issued in International Patent Application No. PCT/JP2021/044083, with English translation, 12 pages.

(Continued)

*Primary Examiner* — Gary F Paumen
(74) *Attorney, Agent, or Firm* — FOLEY & LARDNER LLP

(57) ABSTRACT

A power source connector (15) includes an outer peripheral wall (22) on the outer peripheral side, two power source terminals (21), a sealing part (25) made of a potting agent which seals the peripheries of the root sides of the power source terminals (21), and a recessed part (26) located between the two power source terminals (21). A bottom surface (**26*a*) of the recessed part (26) is located more on the root sides of the power source terminals (21) than a top portion (25*a*) of the sealing part (25). The power source connector (15) is provided with an airtight structure (liquid-tight structure) which prevents water from entering from the root sides of the power source terminals (21) by the sealing part (25). Therefore, the power source connector (15**) can suppress the occurrence of a short circuit on a circuit board due to water which has entered inside.

6 Claims, 14 Drawing Sheets

(58) Field of Classification Search
USPC .................................................. 439/589, 936
See application file for complete search history.

(56) References Cited

U.S. PATENT DOCUMENTS

| | | | | | |
|---|---|---|---|---|---|
| 4,266,844 | A * | 5/1981 | Chelminski | H01R 13/523 | 439/453 |
| 4,335,932 | A * | 6/1982 | Herrmann, Jr. | H01R 43/24 | 174/541 |
| 4,445,744 | A * | 5/1984 | Sedig | H01R 13/521 | 439/271 |
| 7,445,481 | B2 * | 11/2008 | Nagashima | H01R 13/521 | 439/936 |
| 10,063,008 | B2 * | 8/2018 | Kawai | H01R 13/5812 | |
| 10,931,046 | B2 * | 2/2021 | Komori | H01R 12/716 | |
| 2018/0309229 | A1 * | 10/2018 | Hashimoto | H01R 13/5216 | |
| 2019/0334293 | A1 * | 10/2019 | Iwami | B60L 53/16 | |

OTHER PUBLICATIONS

International Search Report dated Jan. 18, 2022 issued in International Patent Application No. PCT/JP2021/044083, with English translation, 5 pages.

* cited by examiner

ELECTRONIC CONTROL DEVICE

TECHNICAL FIELD

The present invention relates to an electronic control device.

BACKGROUND TECHNOLOGY

For example, in a patent document 1, a water temperature sensor has been disclosed in which a heat sensitive element is connected to external terminal plates via lead wires for leading out a signal which are coated with insulating tubes.

The water temperature sensor of the patent document 1 is configured in a manner that a resin case accommodating the heat sensitive element is assembled to a connector part in which the lead wires for leading out a signal and the external terminal plates are molded.

However, the connector part of the patent document 1 has a configuration in which the external terminal plates are molded with resin material such that the distal ends thereof serve as connecting terminals, and the liner expansion coefficient of the external terminal plates is different from that of the resin used for the molding. Consequently, in the water temperature sensor of the patent document 1, a gap is formed at the interface between the outer terminal plates and the resin material due to a repeating change in temperature, and a short circuit might occur due to water which has entered into the inside of the resin case through the gap.

PRIOR ART REFERENCE

Patent Document

Patent Document 1: Japanese Patent Application Publication No. H09-159537

SUMMARY OF THE INVENTION

According to the present invention, in one aspect thereof, a connector part of an electronic control device includes: a plurality of connector terminals electrically connected to a circuit board; a sealing part made of a potting agent which seals the peripheries of the root sides of the connector terminals; and a recessed part located between the connector terminals, and the bottom surface of the recessed part is located more on the root sides of the connector terminals than the top portion of the sealing part.

According to the present invention, the connector part is provided with an airtight structure (liquid-tight structure) which suppresses water from entering from the root sides of the connector terminals by the sealing part, thereby suppressing the occurrence of a short circuit on the circuit board due to water which has entered inside.

MODE FOR IMPLEMENTING THE INVENTION

In the following, one embodiment of the present invention will be explained in detail based on the drawings.

Figure 1:
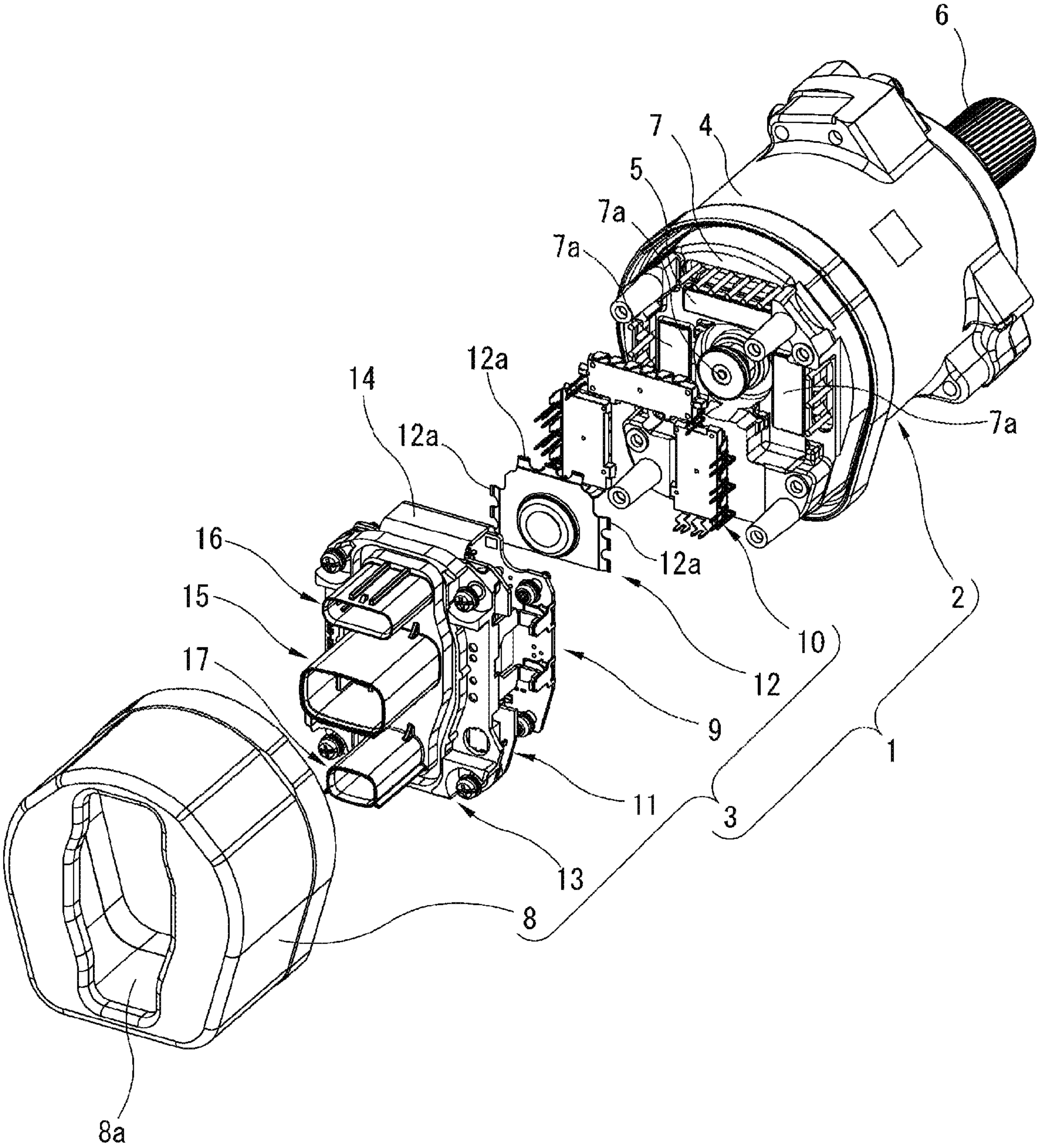
FIG. 1 is a perspective exploded view of an electronic control device to which the present invention has been applied.

FIG. 1 is a perspective exploded view of an electric actuator device 1 of an electric power steering apparatus to which the present invention has been applied. The electric actuator device 1 corresponds to an electronic control device. The basic configuration of the electric actuator device 1 is the same as that of one disclosed in, for example, Japanese Patent Application Publication No. 2020-148639.

The electric actuator device 1 is one for assisting torque at the time of the rotation operation of a steering wheel (not shown), so as to give steering auxiliary force to a steering mechanism (not shown) of a vehicle (not shown).

The electric actuator device 1 includes an electric motor unit 2 and an electronic control unit 3. The electronic control unit 3 calculates, based on a detection value of, for example, a torque sensor (not shown), a steering auxiliary force (drive operation amount) which is generated by the electric motor unit 2, and controls the operation of the electric motor unit 2. The electric motor unit 2 is configured to generate the steering auxiliary force (drive operation amount) based on the detection value of, for example, the torque sensor. That is, the electronic control unit 3 is configured to control the driving of the electric motor unit 2.

The electric motor unit 2 includes an electric motor which is not shown (for example, a three-phase AC motor) having a plurality of independent windings, and a cylindrical motor housing 4 in which the electric motor is accommodated. That is, the electric motor unit 2 includes the motor housing 4 and the electric motor. In addition, the electric motor unit 2 includes a drive control system in each of the windings of the electric motor.

The motor housing 4 is made of metal material such as aluminum alloy. A distal end side (one end side) of a rotation shaft 5 of the electric motor protrudes from the motor housing 4. That is, in the electric motor unit 2, a distal end of the rotation shaft 5 protrudes from one end side of the motor housing 4 as an output shaft 6 of the electric motor 6.

The rotation torque of the output shaft 6 of the electric motor is transmitted to the steering wheel, so as to assist torque at the time of the rotation operation of the steering wheel.

The motor housing 4 functions as a heat sink member for radiating, to the external atmosphere, the heat generated at the electric motor and the heat generated at the after-mentioned power source circuit part 9 and power conversion circuit part 10.

The electronic control unit 3 is attached to the motor housing 4 so as to be adjacent to an end surface part 7 on the other end side of the motor housing 4 from which the output shaft 6 of the electric motor does not protrude.

This end surface part 7 is formed integrally with the motor housing 4. In addition, the end surface part 7 may be formed separately from the motor housing 4, or may be formed integrally with the motor housing 4 by a bolt or welding.

The electronic control unit 3 is disposed on the other end side of the motor housing 4. The electronic control unit 3 includes a metal cover 8 made of metal material such as aluminum alloy.

A facing end surface on one end side of the metal cover 8 which faces the motor housing 4 is fixed to the end surface part 7 of the motor housing 4 by an adhesive, welding or a fixing bolt.

In addition, the electronic control unit 3 includes a power source circuit part 9 for generating a required power source, a power conversion circuit part 10 having a power switching element for driving and controlling the electric motor of the electric motor unit 2 which is formed, for example, by MOSFET or IGBT, a control circuit part 11 for controlling the power switching element of the power conversion circuit part 10, a lid member 12 which pushes (energizes) the power conversion circuit part 10 toward the end surface part 7 side of the motor housing 4, and a connector terminal assembly 13 serving as a connector head member.

In addition, the power source circuit part 9 is connected to the control circuit part 11 via a connection part 14. That is, the power source circuit part 9 and the control circuit part 11 configure one circuit board (multilayer circuit board) which is bent in a substantially U shape at the connection part 14.

The connector terminal assembly 13 in FIG. 1 is shown in a state of being attached to the control circuit part 11 for convenience.

The power source circuit part 9, the power conversion circuit part 10, the control circuit part 11, the lid member 12 and the connector terminal assembly 13 are accommodated in the metal cover 8. In the electronic control unit 3, the power conversion circuit part 10, the lid member 12, the power source circuit part 9, the control circuit part 11 and the connector terminal assembly 13 are arranged in this order from the end surface part 7 side of the motor housing 4 in the direction away from the end surface part 7.

The control circuit part 11 generates a control signal for driving a switching element of the power conversion circuit part 10, and is composed, for example, of a microcomputer and a peripheral circuit. The control circuit part 11 calculates steering auxiliary force (drive operation amount) of the electric motor based on the detection value of the torque sensor.

The power source circuit part 9 generates power for driving the control circuit part 11 and power for the power conversion circuit part 10, and is composed, for example, of a capacitor, a coil and a switching element.

The power conversion circuit part 10 is one for adjusting electric power which flows to a coil of the electric motor, and is composed of a switching element and the like which form, for example, a three-phase switching element having upper and lower arms. The power conversion circuit part 10 is configured to drive the electric motor with a power switching element, based on the steering auxiliary force (drive operation amount) calculated by the control circuit part 11.

The lid member 12 is located between the power conversion circuit part 10 and the power source circuit part 9, and is attached to the end surface part 7 of the motor housing 4. The lid member 12 is provided with, at the outer periphery thereof, a peripheral portion 12*a* having an elastic function. The lid member 12 pushes the power conversion circuit part 10 toward a heat radiation portion 7*a* formed on the end surface part 7 of the motor housing 10 by the peripheral portion 12*a*, so as to push the power conversion circuit part 10 to the heat radiation portion 7*a*.

The metal cover 8 accommodates the power conversion circuit part 10, the lid member 12, the power source circuit part 9 and the control circuit part 11, and has a function for water-tightly sealing them. The metal cover 8 is adhered and fixed to the motor housing 4 with, for example, a liquid gasket. This liquid gasket is a substance having fluidity at room temperature in general, and when the liquid gasket is applied to a bonded surface, it dries or becomes uniform after the lapse of a predetermined time, so as to form an elastic coating film or a film having adhesiveness. Accordingly, the bonded part formed with the liquid gasket has a function for keeping liquid-tightness and a pressure proof function. In addition, since the metal cover 8 is made of metal, it also has a function for radiating, to the outside, heat generated at the power conversion circuit part 10, the power source circuit part 9 and the like.

The connector terminal assembly 13 is located between the control circuit part 11 and the metal cover 8. The connector terminal assembly 13 includes a connector 15 for power source, a connector 16 for sensor input and a connector 17 for communication, and they are arranged so as to be directed in the direction along the axial direction of the rotation shaft 5.

The power source connector 15 is connected to a vehicle battery (not shown) for supplying electric power. The power source connector 15 is located between the sensor input connector 16 and the communication connector 17. That is, the power source connector 15 is located at the middle of the connector terminal assembly 13.

Signals from sensors (for example, a steering angle sensor and a toque sensor) disposed on the steering mechanism side are input to the sensor input connector 16.

The communication connector 17 is one for carrying out communication (for example, CAN communication) with another control device inside a vehicle.

The power source connector 15, the sensor input connector 16 and the communication connector 17 protrude outside through an opening part 8*a* of the metal cover 8.

Then, the present invention is applied to the power source connector 15. That is, the power source connector 15 corresponds to a connector part of the present invention.

Figure 2:
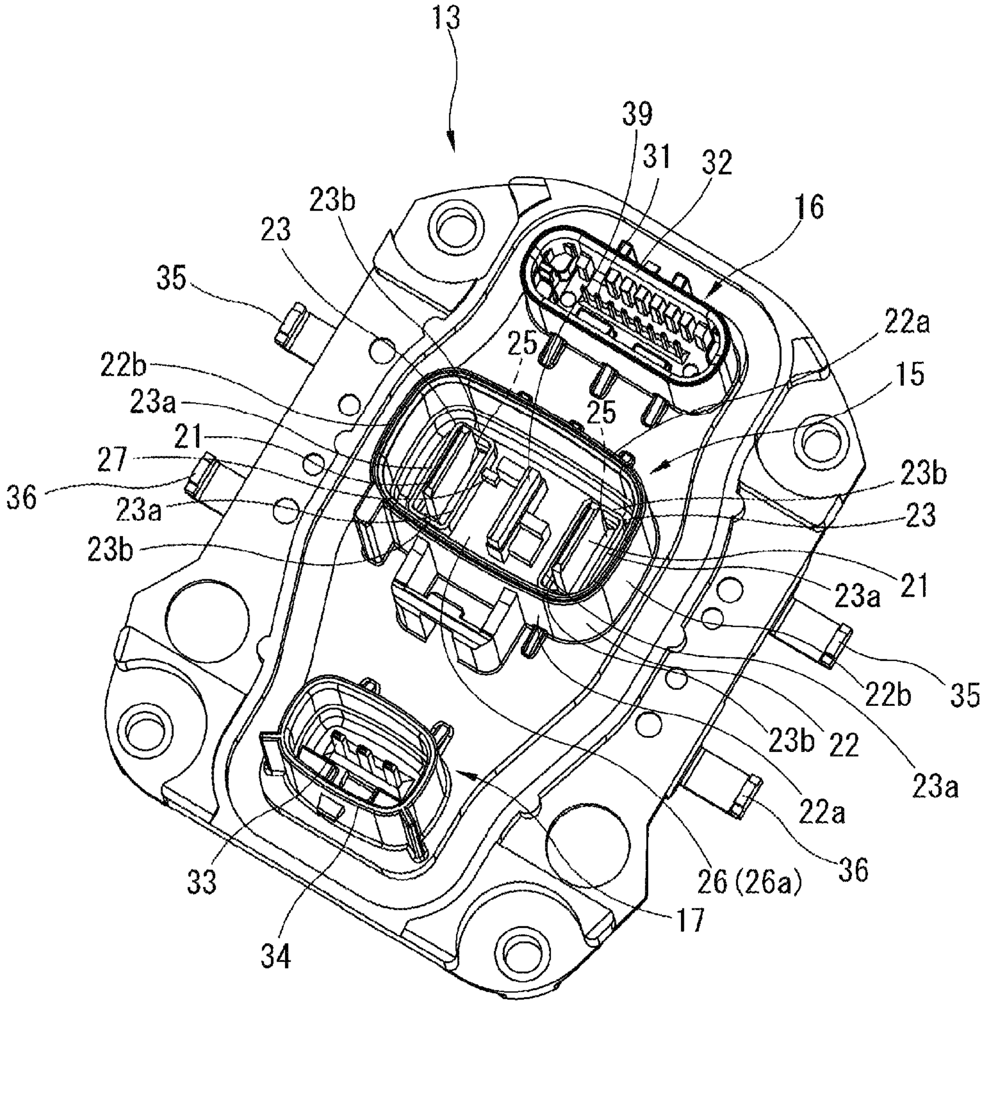
FIG. 2 is a perspective view of a connector terminal assembly of a first embodiment.
Figure 3:
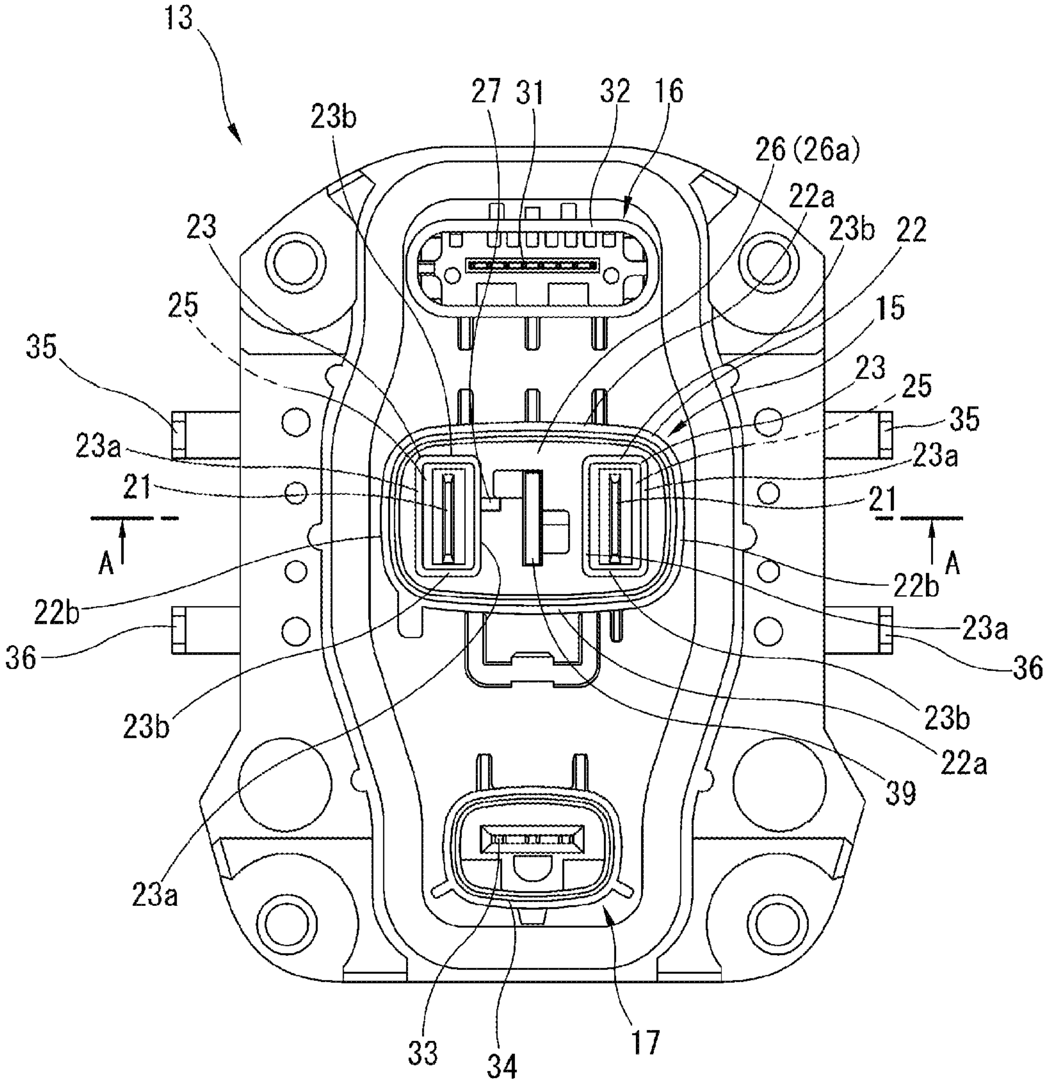
FIG. 3 is a plane view of the connector terminal assembly of the first embodiment.
Figure 4:
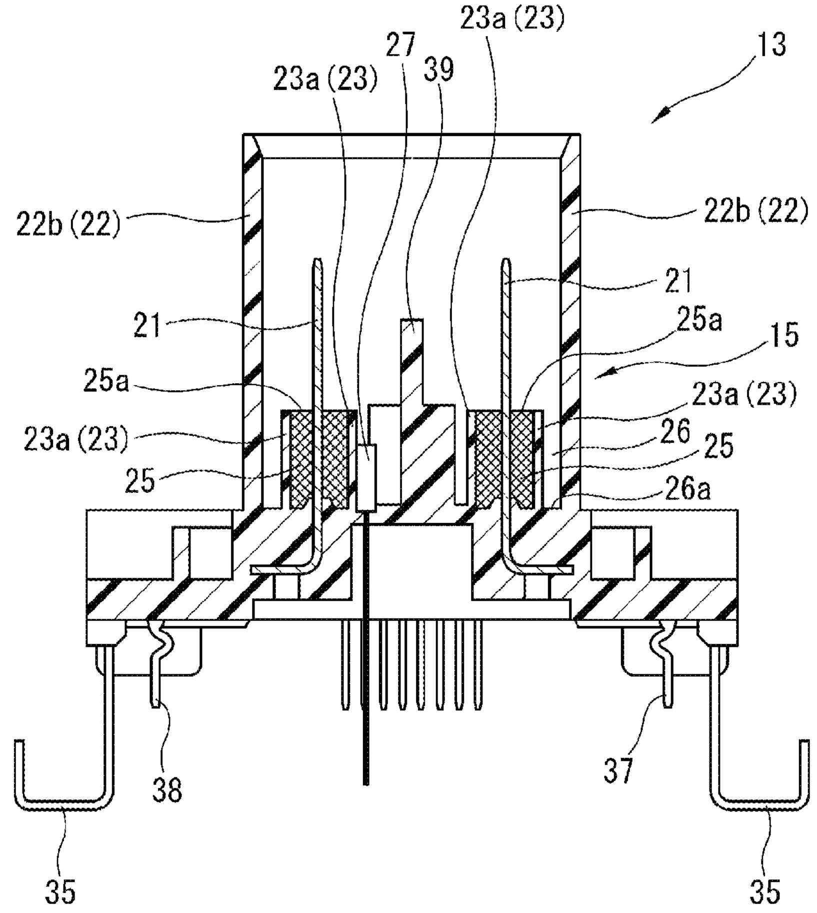
FIG. 4 is a sectional view corresponding to a position along an A-A line of FIG. 3.

FIGS. 2-4 show a connector terminal assembly 13 of a first embodiment to which the present invention has been applied. FIG. 2 is a perspective view of the connector terminal assembly 13 of the first embodiment. FIG. 3 is a plane view of the connector terminal assembly 13 of the first embodiment. FIG. 4 is a sectional view corresponding to a position along an A-A line of FIG. 3. In addition, in FIGS. 2 and 3, for convenience, there is shown a connector terminal assembly 13 in a state in which the after-mentioned potting agent has not been injected.

The power source connector 15 is a connector head which is capable of supplying electric power. Specifically, the power source connector 15 includes two power source terminals 21 for supplying electric power, a cylindrical outer peripheral wall 22 located on the outermost peripheral side, and two terminal peripheral walls 23 formed so as to surround the respective peripheries of the power source terminals 21. In the power source connector 15, parts through which electricity does not flow such as the outer peripheral wall 22 and the terminal peripheral walls 23 are made of resin material such as synthetic resin.

The power source terminals 21 correspond to connector terminals electrically connected to the control circuit part 11 and the power source circuit part 9, and are located on the inner side of the outer peripheral wall 22 and the terminal peripheral walls 23.

The outer peripheral wall 22 located on the outer side includes a pair of wide side portions 22*a* along the arrangement direction of the power source terminals 21, and a pair of narrow side portions 22*b* connected to the pair of the wide side portions 22*a*.

That is, in the plane view of the connecter terminal assembly 13, the outer shape of the power source connector 15 is formed so as to be a substantially narrow and long rectangular shape along the arrangement direction of the power source terminals 21.

Each of the terminal peripheral walls 23 is located on the inner peripheral side of the outer peripheral wall 22, and is a protruding portion continuous annularly which has a rectangular outer shape (rectangle). Each of the terminal peripheral walls 23 includes a pair of wide side portions 23*a* along the longitudinal direction of a corresponding one of the power source terminals 21, and a pair of narrow side portions 23*b* connected to the pair of the wide side portions 23*a*.

The protruding amount of the terminal peripheral wall 23 along the axial direction of the rotation shaft 5 is set so as to be smaller than that of the outer peripheral wall 22. That is, the distal end of the terminal peripheral wall 23 is formed so as not to protrude to the outside from the distal end of the outer peripheral wall 22.

Then, a sealing part (potting part) 25 made of a potting agent is formed in a region on the inner peripheral side which is surrounded by the terminal peripheral wall 23. The terminal peripheral wall 23 forms the sealing part 25 that is a closed region on the inner peripheral side thereof. The sealing part 25 surrounds and seals the periphery on the root side of the power source terminal 21. The potting agent is made of material such as resin material. The potting agent is injected (filled) to the region on the inner peripheral side which is surrounded by the terminal peripheral wall 23, after the connector terminal assembly 13 as shown in FIGS. 2 and 3 is formed.

The potting agent is injected up to the distal end position (distal end height) of the terminal peripheral wall 23. A top portion (distal end) 25*a* of the sealing part 25 is the same height as the distal end of the terminal peripheral wall 23.

Accordingly, in the power source connector 15, as shown in FIG. 4, a recessed part 26 is formed between the two power source terminals 21.

The recessed part 26 is located between the outer peripheral wall 22 and the terminal peripheral walls 23. In other words, in the power source connector 15, the region sandwiched between the outer peripheral wall 22 and the terminal peripheral walls 23 is the recessed part 26. A bottom surface 26*a* of the recessed part 26 is located more on the root side of the power source terminal 21 than the top portion 25*a* of the sealing part 25. That is, the top portion 25*a* of the sealing part 25 is located more on the distal end side of the power source terminal 21 than the bottom surface 26*a* of the recessed part 26.

The recessed part 26 is located on the inner side of the outer peripheral wall 22, and is recessed toward the power source connector 15 side in the connection direction of the power source connector 15 (connection direction of the power source connector 15 and a connector to be connected to the power source connector 15). In other words, the distal end of the terminal peripheral wall 23 protrudes more than the bottom surface 26*a* of the recessed part 26.

Then, a sensor 27 which is capable of detecting whether or not there is water inside the recessed part 26 is disposed in the recessed part 26. That is, the power source connector 15 includes the sensor 27 which is capable of detecting whether or not there is water inside the recessed part 26.

The sensor 27 may be one for detecting a state when the accumulation of water inside, for example, the recessed part 26 stats, or may be one for detecting a state when a predetermined amount of water is accumulated inside, for example, the recessed part 26. Since the sensor 27 is capable of detecting whether or not there is water inside the recessed part 26, when the state in which there is no water inside the recessed part 26 changes to the state in which water enters into the recessed part 26, it can also detect the entering of water into the recessed part 26. The sensor 27 is, for example, a thermistor, and detects whether or not there is water by temperature change or temperature difference.

In the first embodiment, the recessed part 26 is a region in which a potting agent does not exist.

The sensor input connector 16 is a connector head which is capable of inputting signals from various sensors. The sensor input connector 16 includes a signal terminal 31 to which signals from various sensors are input, and a cylindrical outer peripheral wall 32.

The communication connector 17 is a connector head used for outputting, for example, a signal of the present control state of the electric actuator device 1. The communication connector 17 includes a communication terminal 33 for sending and receiving a communication signal with another control device inside a vehicle, and a cylindrical outer peripheral wall 34.

In addition, the numeral "35" in FIGS. 2 to 4 indicates a first positive electrode terminal extending from the power source connector 15. Two first positive electrode terminals 35 are positive electrode external terminals, and are electrically connected to the power source circuit part 9. In addition, the numeral "36" in FIGS. 2 and 3 indicates a first negative electrode terminal extending from the power source connector 15. Two first negative electrode terminals 36 are negative electrode external terminals, and are electrically connected to the power source circuit part 9.

The two positive electrode terminals 35 and the two first negative electrode terminals 36 are provided such that electric power can be supplied to the electric motor unit 2 with two systems.

In addition, the numeral "37" in FIG. 4 indicates a second positive electrode terminal extending from the power source connector 15. The second positive electrode terminal 37 is a positive electrode external terminal, and is electrically connected to the control circuit part 11. The numeral "38" in FIG. 4 indicates a second negative electrode terminal extending from the power source connector 15. The second negative electrode terminal 38 is a negative electrode external terminal, and is electrically connected to the control circuit part 11.

The first positive electrode terminals 35 and the second positive electrode terminal 37 are ones branching from the power source connector 15. The first negative electrode terminals 36 and the second negative electrode terminal 38 are ones branching from the power source connector 15.

In addition, the second positive electrode terminal 37 and the second negative electrode terminal 38 can be omitted. In this case, electric power is supplied to the control circuit part 11 via the power source circuit part 9 and the connection part 14.

In addition, the numeral "39" in FIGS. 2-4 indicates a guide protrusion serving as a guide when an external terminal which is not shown is connected to the power source connector 15.

The above-mentioned power source connector 15 of the first embodiment is provided with an airtight structure (liquid-tight structure) which prevents water from entering into a circuit board side including the control circuit part 11, the power source circuit part 9 and the like from the root side of the power source terminal 21 by the sealing part 25. With this, the power source connector 15 of the first embodiment can suppress the occurrence of a short circuit (short) on a circuit board due to water which has entered inside.

In addition, the power source connector 15 is formed with the recessed part 26 between a plurality of the power source terminals 21.

The recessed part 26 can store water which has entered into the power source connector 15. That is, the recessed part 26 can suppress the occurrence of the short circuit (short) between the power source terminals 21 due to the spreading of a small amount of water in a thin film shape which has entered into the power source connector 15.

Since the recessed part 26 can store (keep) water which has entered into the power source connector 15, even if water enters into the power source connector 15, the period until the occurrence of the short circuit (short) between the power source terminals 21 can be longer.

In the power source connector 15, the recessed part 26 serves as a non-potting region in which a potting agent is not filled.

Consequently, in the power source connector 15, as a whole, the amount of use of the potting agent can be reduced.

Since the power source connector 15 is provided with the sensor 27 which is capable of detecting whether or not there is water inside the recessed part 26, the possibility of the occurrence of the short circuit (short) between the power source terminals 21 due to entering of water into the power source connector 15 can be detected, before the short circuit occurs. That is, the connecter terminal assembly 13 can avoid the occurrence of the short circuit (short) between the power source terminals 21 due to entering of water into the power source connector 15.

Figure 5:
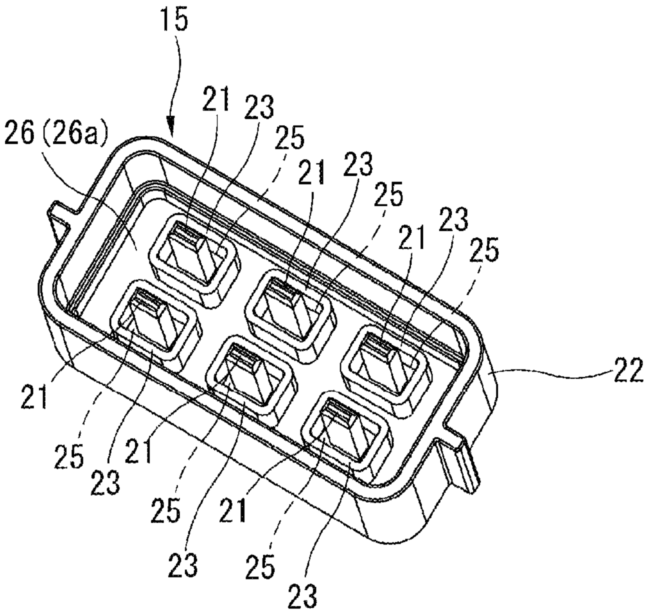
FIG. 5 is a perspective view showing a variation of a connector for power source in the first embodiment.
Figure 6:
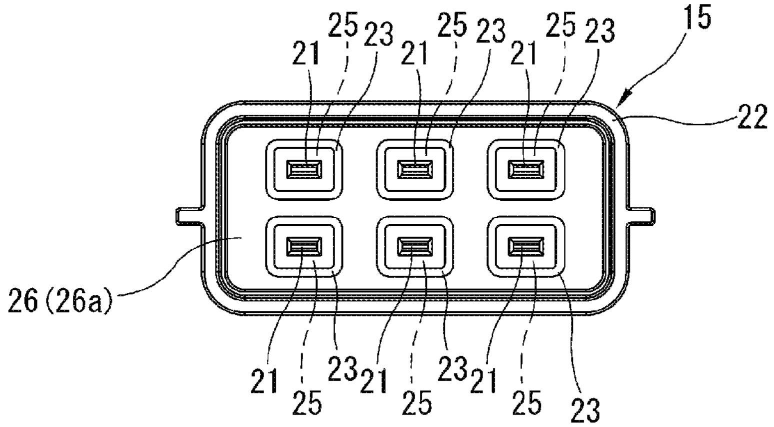
FIG. 6 is a plane view showing the variation of the power source connector in the first embodiment.

In addition, the power source connector 15 in the first embodiment may be formed such that the power source terminals 21 are arranged in a plurality of rows. FIGS. 5 and 6 show an example (variation of the first embodiment) in which six power source terminals 21 are provided and are arranged in two rows in the power source connector 15. FIG. 5 is a perspective view of the power source connector 15 including two rows of the power source terminals 21. FIG. 6 is a plane view of the power source connector 15 including two rows of the power source terminals 21. In addition, in FIGS. 5 and 6, for convenience, there is shown a power source connector 15 in a state in which a potting agent has not been injected.

In an example (variation) shown in FIGS. 5 and 6, a terminal peripheral wall 23 is formed to the periphery of each of all the power source terminals 21.

Then, a region on the inner peripheral side of each of all the terminal peripheral walls 23 serves as a sealing part 25 (potting region) in which a potting agent is filled.

In addition, a region on the outer peripheral side of each of the terminal peripheral walls 23 serves as a recessed part 26 (non-potting region) in which a potting agent is not filled.

In the variation of the first embodiment shown in FIGS. 5 and 6, the same working effects as the first embodiment mentioned above can also be obtained.

In the following, other embodiments of the present invention will be explained. In addition, the same reference numbers are applied to the same components as the first embodiment, and redundant explanation is omitted.

A second embodiment of the present invention will be explained by referencing FIGS. 7 to 9.

Figure 7:
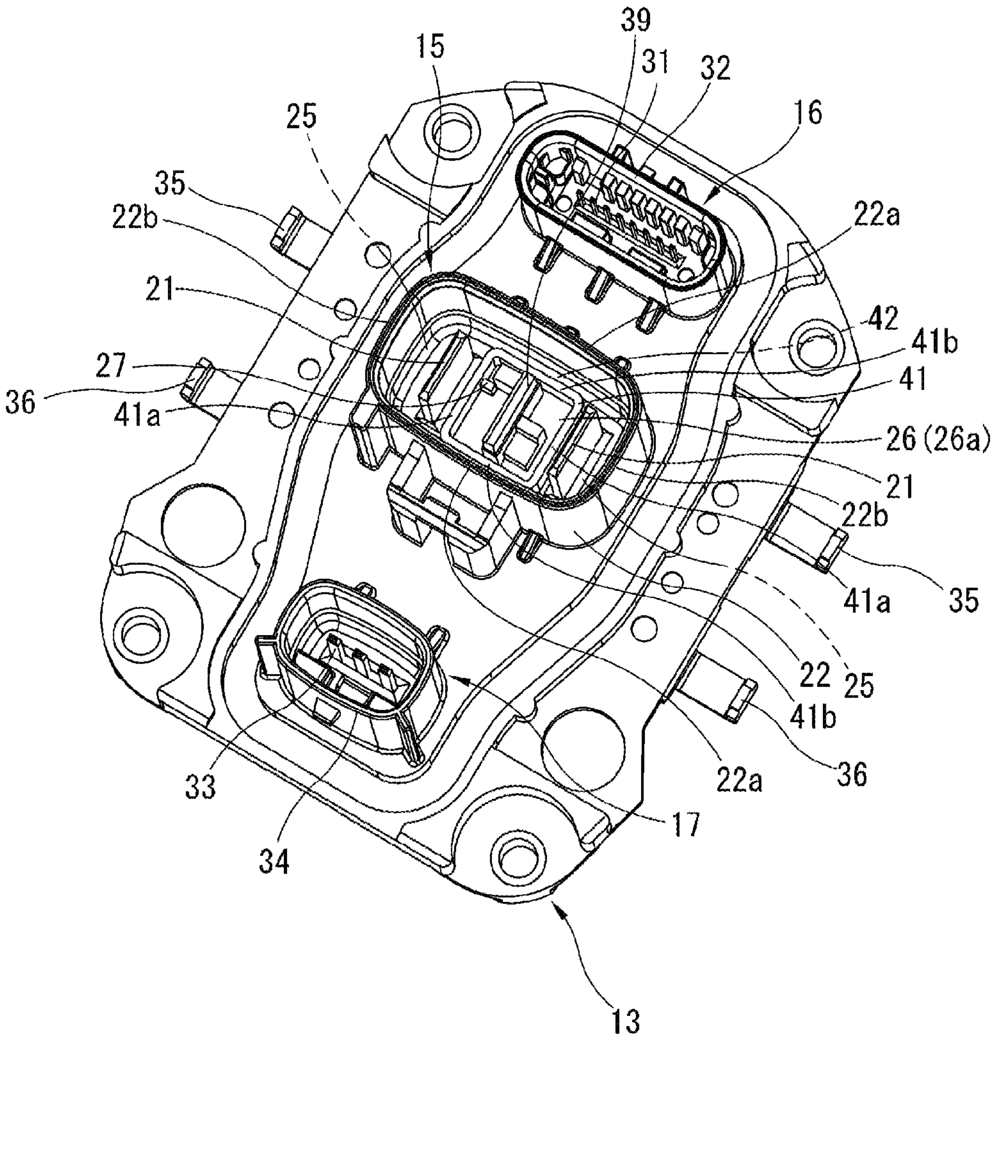
FIG. 7 is a perspective view of the connector terminal assembly of a second embodiment.
Figure 8:
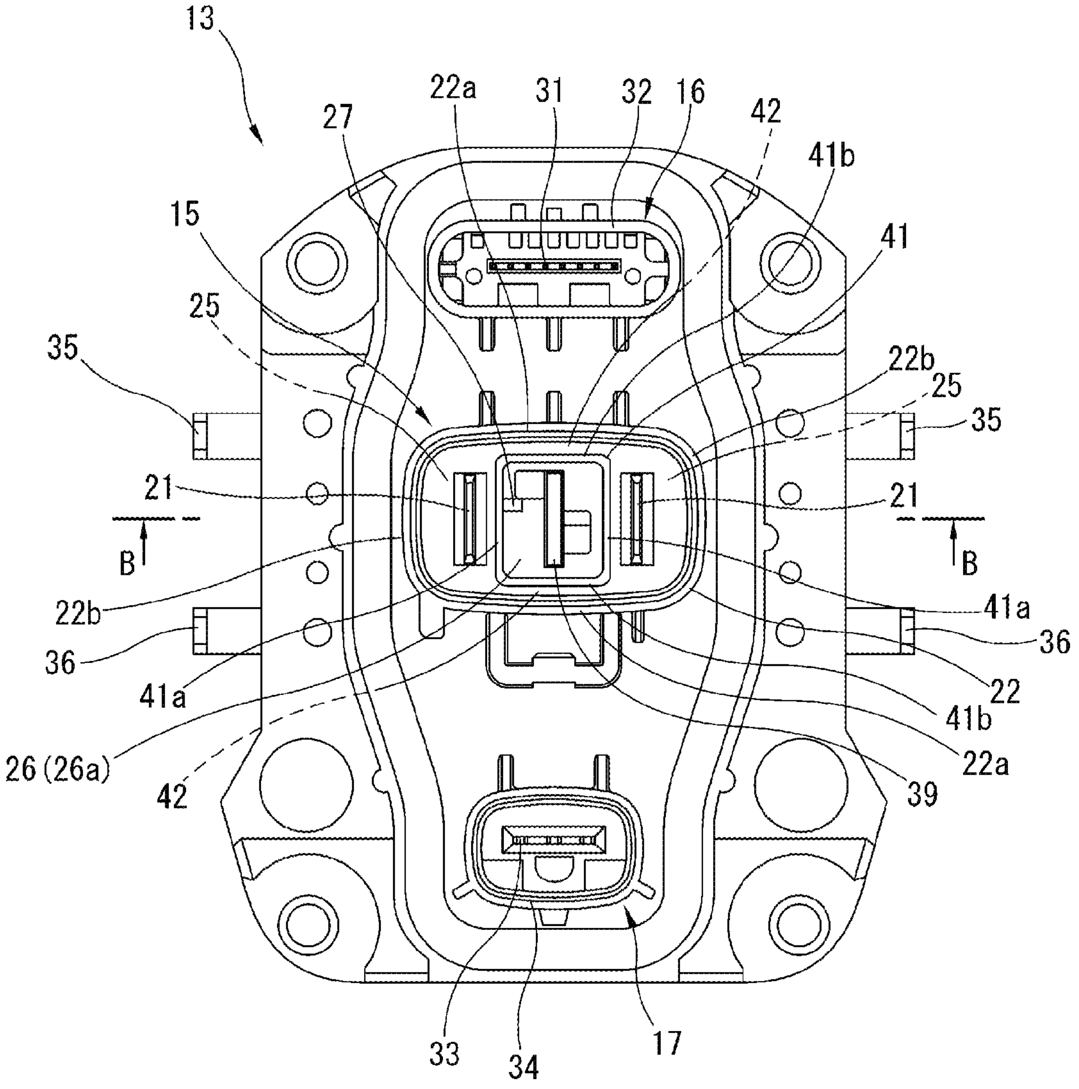
FIG. 8 is a plane view of the connector terminal assembly of the second embodiment.
Figure 9:
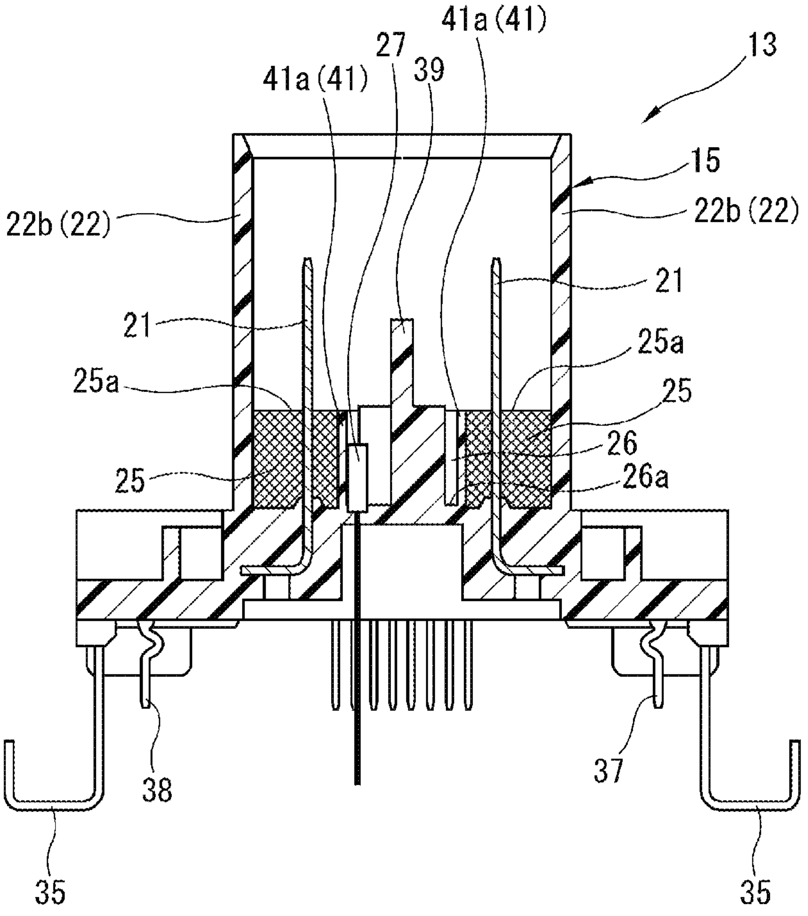
FIG. 9 is a sectional view corresponding to a position along a B-B line of FIG. 8.

In FIGS. 7 to 9, there is shown a connector terminal assembly 13 of a second embodiment to which the present invention has been applied. FIG. 7 is a perspective view of the connector terminal assembly 13 of the second embodiment. FIG. 8 is a plane view of the connector terminal assembly 13 of the second embodiment. FIG. 9 is a sectional view corresponding to a position along a B-B line of FIG. 8. In addition, in FIGS. 7 and 8, for convenience, there is shown a connector terminal assembly 13 in a state in which a potting agent has not been injected.

Although the connector terminal assembly 13 of the second embodiment has substantially the same configuration as the first embodiment mentioned above, the power source connector 15 is not provided with the terminal peripheral wall 23, and the power source connector 15 includes an inner side wall 41 for forming a recessed part 26 on the inner peripheral side, instead of the terminal peripheral wall 23.

The inner side wall 41 is located on the inner peripheral side of the outer peripheral wall 22, and is a protruding portion continuous annularly which has a rectangular outer shape (rectangle). The inner side wall 41 includes a pair of first side portions 41*a* along the longitudinal direction of the power source terminals 21, and a pair of second side portions 41*b* connected to the pair of the first side portions 41*a*. The pair of the first side portions 41*a* correspond to partition walls facing the power source terminals 21, and the number of the first side portions 41*a* is the same as that of the power source terminals 21.

The inner side wall 41 is set such that the protrusion amount along the axial direction of the rotation shaft 5 is smaller than that of the outer peripheral wall 22. That is, the distal end of the inner side wall 41 is formed so as not to protrude more on the outer side than the distal end of the outer peripheral wall 22.

Then, a region on the outer peripheral side of the inner side wall 41 serves as a potting region in which a potting agent is filled. The potting agent is made of, for example, resin material.

A sealing part 25 and a passage part 42 are formed in the potting region.

The sealing part 25 surrounds and seals the root sides of the power source terminals 21.

The passage part 42 is formed between the outer peripheral wall 22 and the second side portions 41*b* of the inner side wall 41. That is, the sealing part 25 is formed between the first side portions 41*a* and the power source terminals 21, and the passage part 42 is formed between the second side portions 41*b* and the outer peripheral wall 22. The sealing part 25 in the second embodiment is continued to an adjacent sealing part 25 via the passage part 42.

A top portion 25*a* of the sealing part 25 is located at the same position as the top portion of the passage part 42, in the axial direction of the rotation shaft 5. That is, the passage part 42 is formed such that the top portion is located at substantially the same height as the top portion 25*a* of the sealing part 25.

The potting agent is injected (filled) to the region on the outer peripheral side of the inner side wall 41, after forming the connector terminal assembly 13 as shown in FIGS. 7 and 8. The potting agent is injected up to the distal end position (distal end height) of the inner side wall 41. The height of the top portion 25*a* (distal end) of the sealing part 25 is the same as that of the distal end of the inner side wall 41.

In addition, the first side portions 41*a* are located more on the power source terminal 21 side than the middle position between the power source terminals 21 facing each other. In other words, the first side portions 41*a* form a sealing part 25 between the power source terminals 21 and the first side portions 41*a* without including the middle position between the power source terminals 21 facing each other.

The inner side wall 41 forms a recessed part 26 on the inner peripheral side thereof which is a closed region. The recessed part 26 is located between a pair of the power source terminals 21. In other words, in the power source connector 15 in the second embodiment, the region surrounded by the inner side wall 41 becomes a recesses part 26. A bottom surface 26*a* of the recessed part 26 is located more on the root sides of the power source terminals 21 than the top portion 25*a* of the sealing part 25. That is, the top portion 25*a* of the sealing part 25 is located more on the distal end sides of the power source terminals 21 than the bottom surface 26*a* of the recessed part 26.

The recessed part 26 is located on the inner side of the outer peripheral wall 22, and is recessed toward the power source connector 15 side in the connection direction of the power source connector 15 (connection direction of the power source connector 15 and a connector to be connected to the power source connector 15). In other words, the distal end of the inner side wall 41 protrudes more than the bottom surface 26*a* of the recessed part 26.

In the second embodiment, the recessed part 26 is a region in which a potting agent does not exist. In the second embodiment, the sealing part 25 is continued to an adjacent sealing part of the power source terminal 21 via the passage part 42 formed between the outer peripheral wall 22 and the inner side wall 41.

In the second embodiment, working effects substantially the same as the first embodiment mentioned above can also be obtained.

Figure 10:
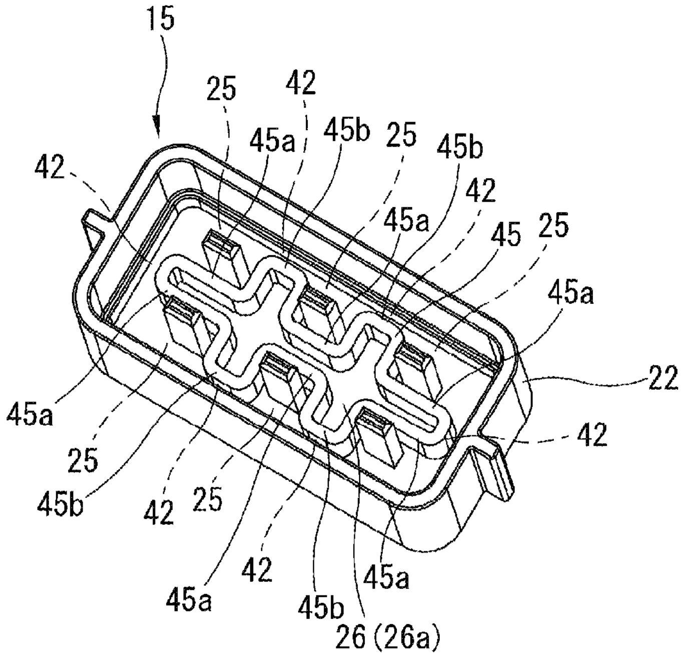
FIG. 10 is a perspective view showing a variation of the power source connector in the second embodiment.
Figure 11:
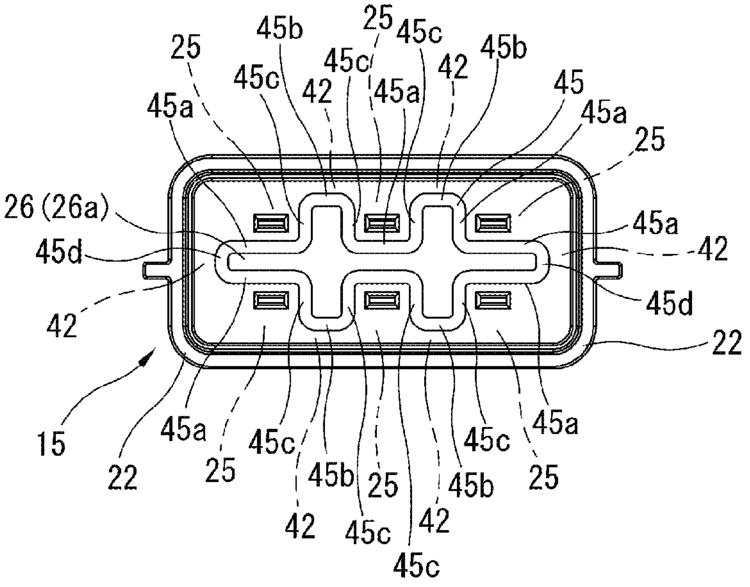
FIG. 11 is a plane view showing the variation of the power source connector in the second embodiment.

In addition, the power source connector 15 in the second embodiment may be formed such that the power source terminals 21 are arranged in a plurality of rows. In FIGS. 10 and 11, there is shown an example (variation of the second embodiment) in which six power source terminals 21 are arranged in two rows, in the power source connector 15 of the second embodiment mentioned above. FIG. 10 is a perspective view of the power source connector 15 including two rows of the power source terminals 21. FIG. 11 is a plane view of the power source connector 15 including two rows of the power source terminals 21. In addition, in FIGS. 10 and 11, for convenience, a power source connector 15 in a state in which a potting agent has not been injected is shown.

In the example (variation) shown in FIGS. 10 and 11, an inner side wall 41 is formed on the inner peripheral side of the outer peripheral wall 22, and between the power source terminals 21. The inner side wall 41 is a protruding portion continuous annularly, and includes a plurality of first side portions 45*a* (six first side portions) along the longitudinal direction of the power source terminals 21, a plurality of second side portions 45*b* (four second side portions) along the longitudinal direction of the power source terminals 21, a plurality of third side portions 45*c* (eight third side portions) along the short-side direction of the power source terminals 21, and a plurality of fourth side portions 45*d* (two fourth side portions) along the short-side direction of the power source terminals 21.

The first side portion 45*a* is located between a pair of power source terminals 21 facing each other. The second side portion 45*b* faces the outer peripheral wall 22. The third side portion 45*c* is located between power source terminals 21 adjacent to each other. The fourth side portion 45*d* faces the outer peripheral wall 22.

Then, a region on the outer peripheral side of the inner side wall 41 serves as a potting region in which a potting agent is filled. A sealing part 25 and a passage part 42 are formed in the potting region.

In addition, a region on the inner peripheral side of the inner side wall 41 serves as a recessed part 26 (non-potting region) in which a potting agent is not filled.

The sealing part 25 surrounds and seals the root sides of the power source terminals 21. In the power source connector 15 shown in FIGS. 10 and 11, a passage part 42 is formed between the second side portions 45*b* and the outer peripheral wall 22, and between the fourth side portions 45*d* and the outer peripheral wall 22.

The inner side wall 41 forms the recessed part 26 with a plurality of the power source terminals 21 therebetween.

In the variation of the second embodiment shown in FIGS. 10 and 11, similar to the second embodiment mentioned above, working effects substantially the same as the first embodiment mentioned above can also be obtained.

A third embodiment of the present invention will be explained by referencing FIGS. 12 to 14.

Figure 12:
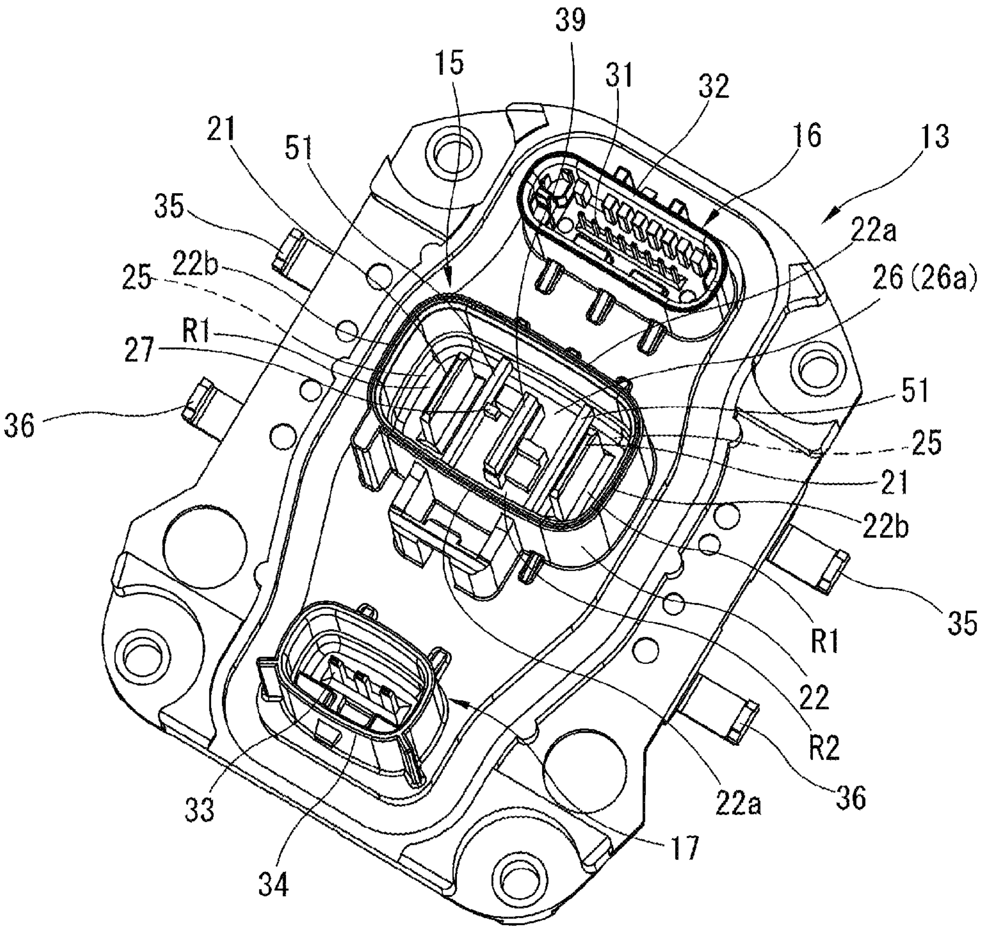
FIG. 12 is a perspective view of the connector terminal assembly of a third embodiment.
Figure 13:
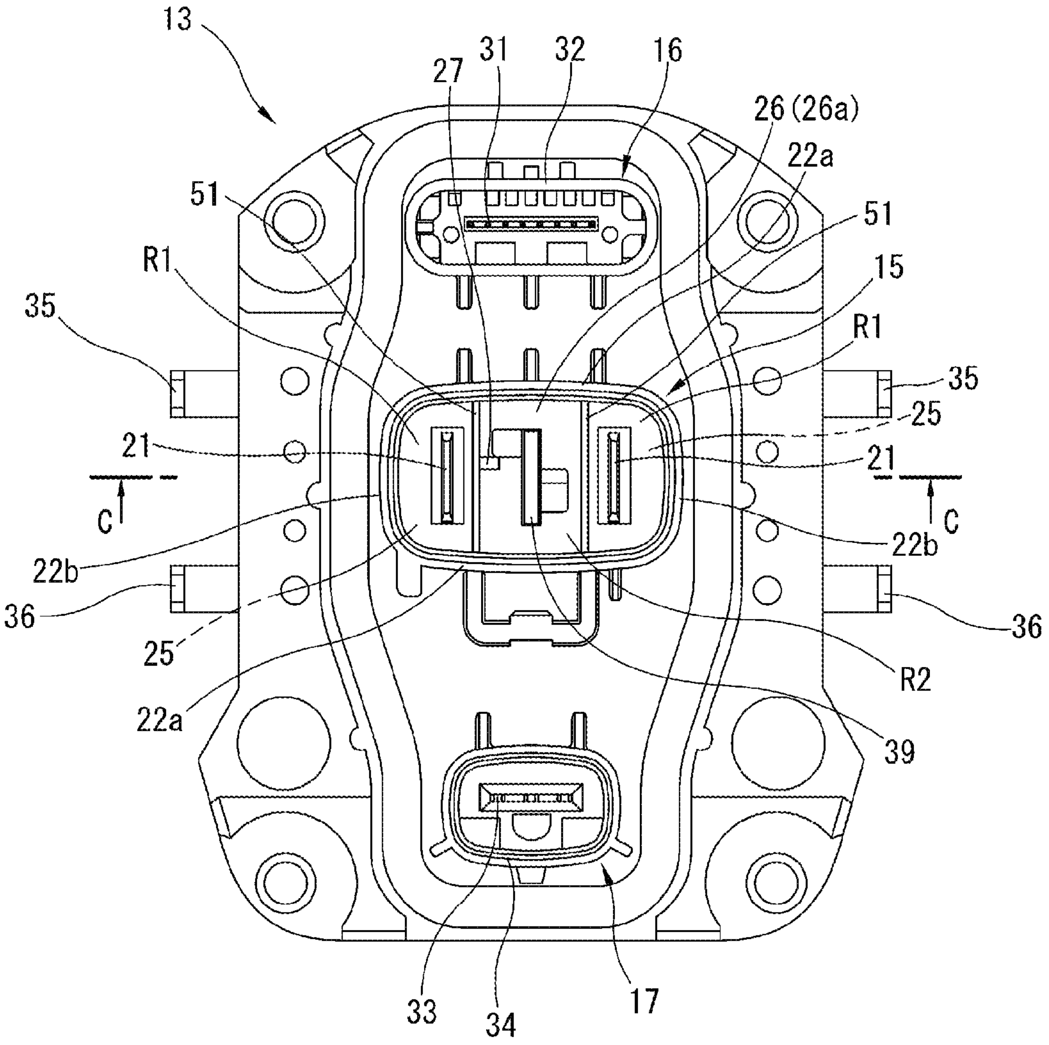
FIG. 13 is a plane view of the connector terminal assembly of the third embodiment.
Figure 14:
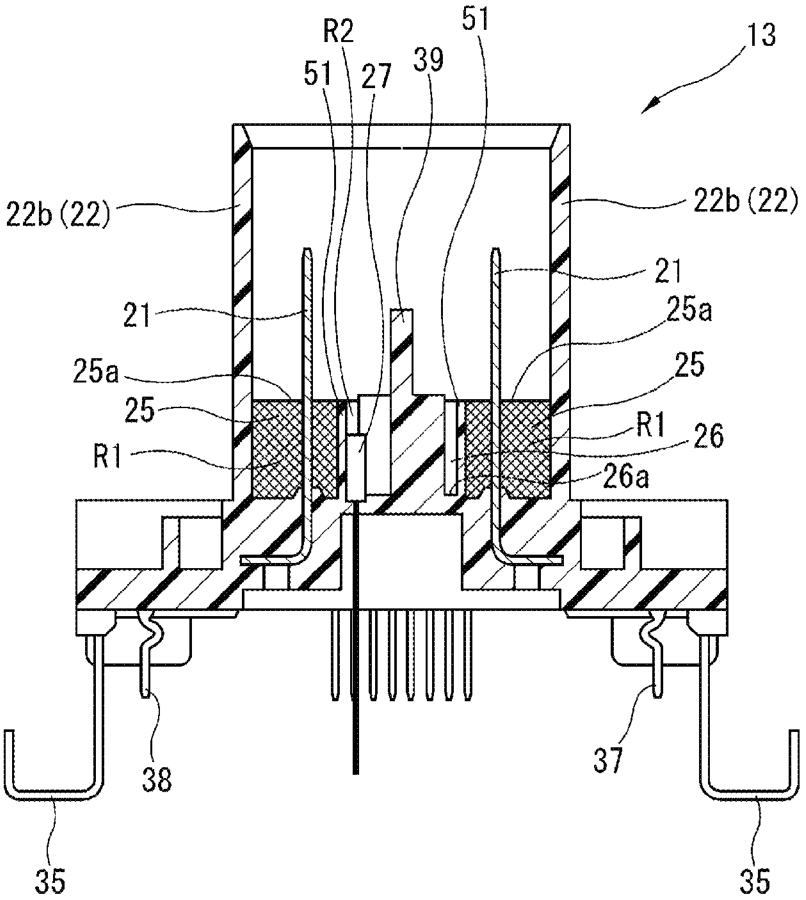
FIG. 14 is a sectional view corresponding to a position along a C-C line in FIG. 13.

In FIGS. 12 to 14, there is shown a connecter terminal assembly 13 of the third embodiment to which the present invention has been applied. FIG. 12 is a perspective view of the connector terminal assembly 13 of the third embodiment. FIG. 13 is a plane view of the connector terminal assembly 13 of the third embodiment. FIG. 14 is a sectional view corresponding to a position along a C-C line of FIG. 13. In addition, in FIGS. 12 and 13, for convenience, there is shown a connector terminal assembly 13 in a state in which a potting agent has not been injected.

Although the connector terminal assembly 13 of the third embodiment has substantially the same configuration as the first embodiment mentioned above, the power source connector 15 is not provided with the terminal peripheral walls 23, and includes partition walls 51, instead of the terminal peripheral walls 23.

The partition walls 51 face the power source terminals 21, and the number of the partition walls 51 is the same as that of the power source terminals 21. The partition walls 51 are liner protruding portions located between a pair of the power source terminals 21, and the both ends of each of the partition walls 51 are connected to the outer peripheral wall 22. That is, the inner peripheral side of the outer peripheral wall 22 is partitioned into two first regions R1 each of which is surrounded by the outer peripheral wall 22 and one partition wall 51, and one second region R2 surrounded by the outer peripheral wall 22 and two partition walls 51. In each of the first regions R1, one power source terminal 21 is located. In the second region R2, a power source terminal 21 is not located. The first regions R1 and the second region R2 are regions located on the inner peripheral side of the outer peripheral wall 22.

The partition wall 51 is set such that the protrusion amount along the axial direction of the rotation shaft 5 is smaller than that of the outer peripheral wall 22. That is, the distal end of the partition wall 51 is formed so as not to protrude more on the outer side than the distal end of the outer peripheral wall 22.

Then, the first region R1 is a potting region in which a potting agent is filled, and serves as a sealing part 25. The sealing part 25 surrounds and seals the root side of a power source terminal 21.

The second region R2 is a non-potting region in which a potting agent is not filled, and serves as a recessed part 26.

The recessed part 26 is located between a pair of the partition walls 51. In other words, in the power source connector 15 in the third embodiment, the region sandwiched between the pair of the partition walls 51 becomes the recessed part 26. A bottom surface 26*a* of the recessed part 26 is located more on the root sides of the power source terminals 21 than a top portion 25*a* of the sealing part 25. That is, the top portion 25*a* of the sealing part 25 is located more on the distal end sides of the power source terminals 21 than the bottom surface 26*a* of the recessed part 26.

The potting agent is injected (filled) to the regions R1, after the connector terminal assembly 13 as shown in FIGS. 12 and 13 is formed. The potting agent is injected up to the distal end positions (distal end height) of the partition walls 51. The top portion 25*a* of the sealing part 25 is located at the same height as that of the distal ends of the partition walls 51.

In addition, the partition wall 51 is located more on the power source terminal 21 side than the middle position between the power source terminals 21 facing each other. In other words, the partition wall 51 forms a sealing part 25 with the power source terminal 21 therebetween, without including the middle position between the power source terminals 21 facing each other.

The recessed part 26 is located between a pair of the partition walls 51. The bottom surface 26*a* of the recessed part 26 is located more on the root sides of the power source terminals 21 than the top portion 25*a* of the sealing part 25. That is, the top portion 25*a* of the sealing part 25 is located more on the distal end sides of the power source terminals 21 than the bottom surface 26*a* of the recessed part 26.

The recessed part 26 is located on the inner side of the outer peripheral wall 22, and is recessed toward the power source connector 15 side in the connection direction of the power source connector 15 (connection direction of the power source connector 15 and a connector to be connected to the power source connector 15). In other words, the distal end of the partition wall 15 protrudes more than the bottom surface 26*a* of the recessed part 26.

In the third embodiment, a region surrounded by the outer peripheral wall 22 and a partition wall 51 whose both ends are connected to the outer peripheral wall 22 is a sealing part 25. In the third embodiment, a region sandwiched between a pair of the partition walls 51 is the recessed part 26.

In the third embodiment, working effects substantially the same as the first embodiment mentioned above can also be obtained.

Figure 15:
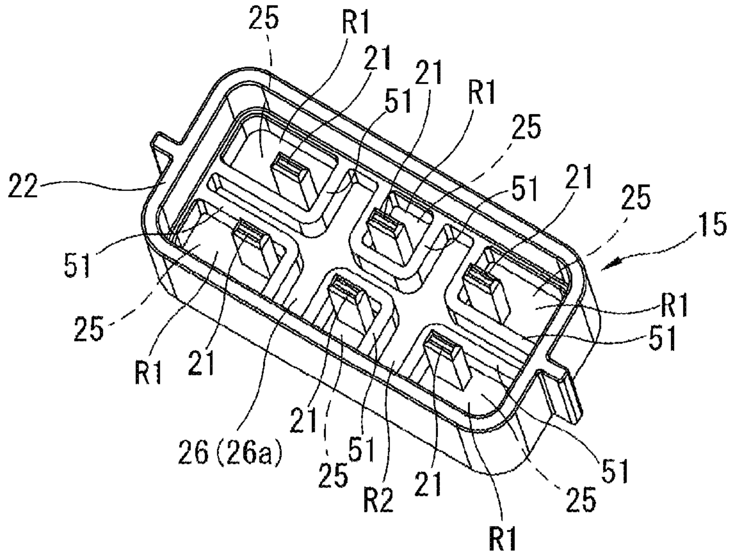
FIG. 15 is a perspective view showing a variation of the power source connector in the third embodiment.
Figure 16:
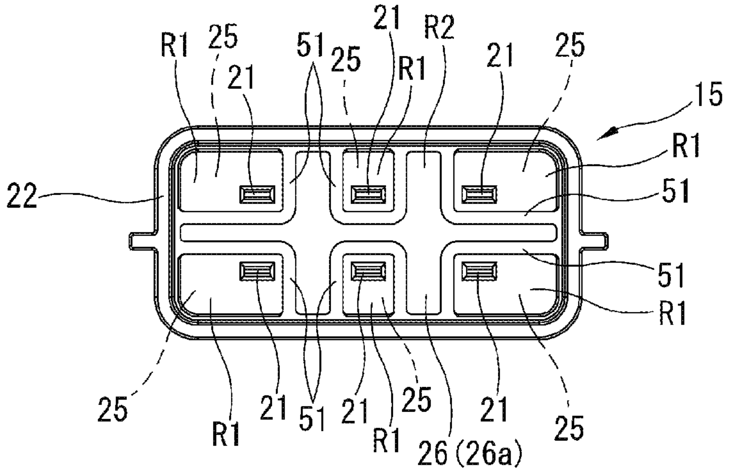
FIG. 16 is a plane view showing the variation of the power source connector in the third embodiment.

In addition, in the power source connector 15 in the third embodiment, the power source terminals 21 may be arranged in a plurality of rows. In FIGS. 15 and 16, there is shown an example (variation of the third embodiment) in which six power source terminals 21 are arranged in two rows, in the power source connector 15 of the third embodiment mentioned above. FIG. 15 is a perspective view of the power source connector 15 including two rows of the power source terminals 21. FIG. 16 is a plane view of the power source connector 15 including two rows of the power source terminals 21. In addition, in FIGS. 15 and 16, for convenience, there is shown a power source connector 15 in a state in which a potting agent has not been injected.

In the example (variation) shown in FIGS. 15 and 16, six partition walls 51 on the inner peripheral side of the outer peripheral wall 22 is formed, and by the six partition walls 51 and the outer peripheral wall 22, six sealing parts 25 and one recessed part 26 are formed on the inner side of the outer peripheral wall 22. Each of the partition walls 51 surrounds the periphery of one power source terminal 21, and the both ends of each of the partition walls 51 are connected to the outer peripheral wall 22.

A region of the periphery of the power source terminal 21 which surrounds the power source terminal 21 serves as a sealing part 25 (potting region) in which a potting agent is filled.

A region in which partition walls 51 face each other becomes a recessed part 26 (non-potting region) in which a potting agent is not filled.

In the variation of the third embodiment shown in FIGS. 15 and 16, similar to the third embodiment mentioned above, working effects substantially the same as the first embodiment can also be obtained.

In addition, in each of the embodiments mentioned above, although a potting agent is not filled in the recessed part 26 of the power source connector 15, a potting agent may be injected to the recessed part 26.

Figure 17:
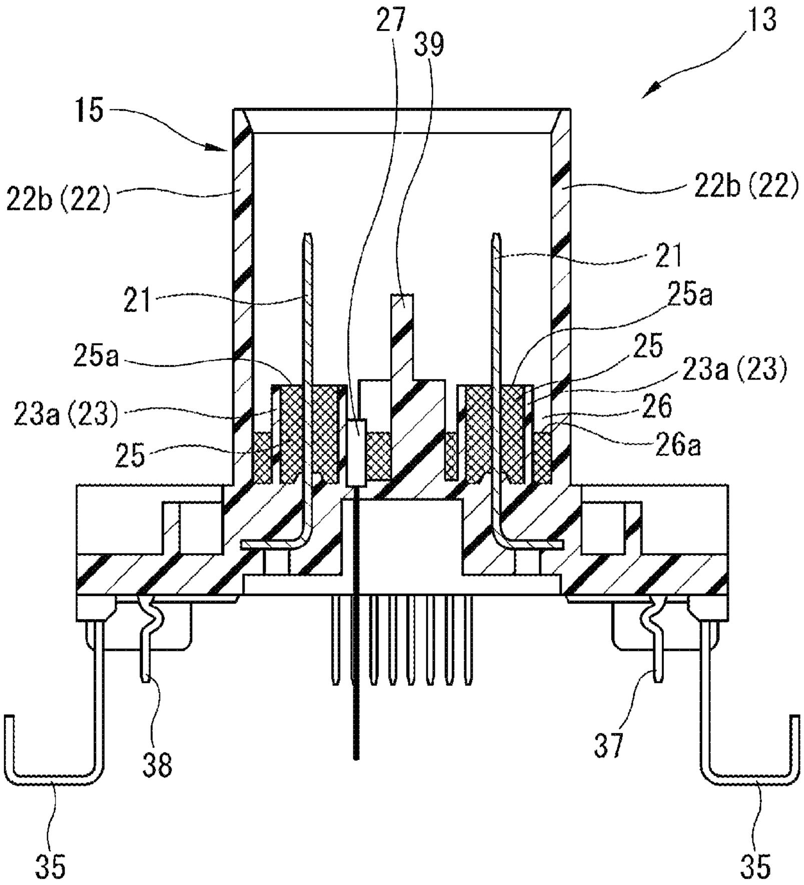
FIG. 17 is a sectional view of a main part of the power source connector in a fourth embodiment.

In FIG. 17, there is shown a fourth embodiment in which a potting agent has been filled in the recessed part 26, and FIG. 17 is a sectional view of a main part of the power source connector 15 in the fourth embodiment. Although the power source connector 15 in the fourth embodiment has substantially the same configuration as that of the power source connector 15 in the first embodiment mentioned above, in a range in which the bottom surface 26*a* of the recessed part 26 is located more on the root sides of the power source terminals 21 than the top portion 25*a* of the sealing part 25, a potting agent is filled in the recessed part 26. That is, in the power source connector 15, a potting agent may be filled such that the bottom surface 26*a* of the recessed part 26 is located more on the root sides of the power source terminals 21 than the top portion 25*a* of the sealing part 25. In the power source connector 15 in the fourth embodiment, in a state in which a potting agent has been filled in the recessed part 26, a recessed part 26 located at the position lower than the top portion 25*a* is also formed at the periphery of the sealing part 25.

In the fourth embodiment, working effects substantially the same as the first embodiment mentioned above can also be obtained.

In addition, in the fourth embodiment, a potting agent of the sealing part 25 may be continued to a potting agent inside the recessed part 26 by a potting agent which goes over the terminal peripheral wall 23.

In addition, although the fourth embodiment has been explained by referencing the first embodiment as an example, in the second and third embodiments, a potting agent may also be filled in the recessed part 26 in a range in which the bottom surface 26*a* of the recessed part 26 is located more on the root sides of the power source terminals 21 than the top portion 25*a* of the sealing part 25.

In addition, the present invention is applied not only to the power source connector 15 of the connector terminal assembly 13 but also to the sensor input connector 16 or the communication connector 17.

As an electronic control device based on the above-mentioned embodiments, for example, the following aspects can be cited.

An electronic control device is provided with a connector part connected to a mating connector, wherein the connector part includes: a cylindrical outer peripheral wall located on the outermost peripheral side; a plurality of connector terminals which are located on the inner peripheral side of the outer peripheral wall, and are electrically connected to a circuit board; a sealing part which is located on the inner peripheral side of the outer peripheral wall, is made of a potting agent, and seals a periphery of a root side of each of the connector terminals; a recessed part which is located on the inner peripheral side of the outer peripheral wall, is located between the connector terminals, and is recessed toward the connector part side in the connection direction of the connector terminals, and wherein a bottom surface of the recessed part is located more on the root side of each of the connector terminals than a top portion of the sealing part.

Then, in the electronic control device, the recessed part is a region in which a potting agent does not exist, namely a non-potting region in which a potting agent is not filled.

In addition, in the electronic control device, a potting agent may be filled in the recessed part such that the bottom surface of the recessed part is located more on the root side of each of the connector terminals than the top portion of the sealing part.

The electronic control device may include partition walls which face the respective connector terminals, and serve as boundaries with the recessed part.

In the electronic control device, the number of the partition walls is the same as that of at least the connector terminals, the sealing part is formed between the partition walls and the connector terminals, a part of each of the partition walls which is located between the connector terminals facing each other is located more on the connector terminal side than the middle position between the connector terminals facing each other, so as to form the sealing part without including the middle position between the connector terminals facing each other.

In the electronic control device, each of the partition walls is a part of an inner side wall which forms the recessed part on the inner peripheral side thereof, the inner side wall is located on the inner peripheral side of the outer peripheral wall, and the sealing part is continued to an adjacent sealing part of a corresponding one of the connector terminals via a passage part formed between the outer peripheral wall and the inner side wall.

The electronic control device may include, at the connector part, a sensor capable of detecting whether or not there is water inside the recessed part.

The invention claimed is:

1. An electronic control device comprising:

a connector part connected to a mating connector, wherein the connector part includes:

an outer peripheral wall on an outer peripheral side;

a plurality of connector terminals electrically connected to a circuit board;

a sealing part which is made of a potting agent, and seals a periphery of a root side of each of the connector terminals; and a recess located between the connector terminals, and wherein a bottom surface of the recess is located more on the root side of each of the connector terminals than a top portion of the sealing part;

wherein the recess is a region in which the potting agent does not exist.

2. The electronic control device according to claim 1, further comprising a terminal peripheral wall which surrounds a periphery of each of the connector terminals, wherein an inner peripheral side of the terminal peripheral wall defines a potting region in which the potting agent is filled.

3. The electronic control device according to claim 1, further comprising partition walls which face the respective connector terminals.

4. The electronic control device according to claim 3, wherein a number of the partition walls is a same as that of at least the connector terminals, wherein the sealing part is formed between the partition walls and the connector terminals, and wherein a part of each of the partition walls which is located between the connector terminals facing each other is located more on a connector terminal side than a middle position between the connector terminals facing each other.

5. The electronic control device according to claim 3, wherein each of the partition walls is a part of an inner side wall which at least partially defines the recess on an inner peripheral side thereof, and wherein the sealing part is continued to an adjacent sealing part of a corresponding one of the connector terminals via a passage part formed between the outer peripheral wall and the inner side wall.

6. The electronic control device according to claim 1, further comprising, at the connector part, a sensor capable of detecting whether or not there is water inside the recess.

* * * * *